United States Patent
Vetters et al.

(10) Patent No.: US 10,767,497 B2
(45) Date of Patent: Sep. 8, 2020

(54) TURBINE VANE ASSEMBLY WITH CERAMIC MATRIX COMPOSITE COMPONENTS

(71) Applicants: Rolls-Royce Corporation, Indianapolis, IN (US); Rolls-Royce plc, London (GB)

(72) Inventors: Daniel K. Vetters, Indianapolis, IN (US); Michael J. Whittle, Derby (GB); Eric Koenig, Fishers, IN (US); Jeffrey A. Walston, Indianapolis, IN (US)

(73) Assignees: Rolls-Royce Corporation, Indianapolis, IN (US); Rolls-Royce plc, London (*) Notice: Subject to any disclaimer, the term of this patent is extended or adjusted under 35 U.S.C. 154(b) by 91 days.

(21) Appl. No.: 16/124,970

(22) Filed: Sep. 7, 2018

(65) Prior Publication Data
US 2020/0080429 A1    Mar. 12, 2020

(51) Int. Cl.
| F01D 9/02 | (2006.01) |
| F01D 5/28 | (2006.01) |
| F01D 11/08 | (2006.01) |
| F01D 25/00 | (2006.01) |
| F01D 9/04 | (2006.01) |

(52) U.S. Cl.
CPC ............ *F01D 5/284* (2013.01); *F01D 9/042* (2013.01); *F01D 11/08* (2013.01); *F01D 25/005* (2013.01); F05D 2260/30 (2013.01); F05D 2260/31 (2013.01); F05D 2260/38 (2013.01); F05D 2300/50212 (2013.01); F05D 2300/6033 (2013.01)

(58) Field of Classification Search
CPC ...... F01D 5/284; F01D 9/042; F05D 2260/31; F05D 2260/38
See application file for complete search history.

(56) References Cited

U.S. PATENT DOCUMENTS

| 4,285,634 A | 8/1981 | Rossman et al. |
| 4,790,721 A | 12/1988 | Morris et al. |
| 6,000,906 A * | 12/1999 | Draskovich ........... F01D 5/3084 415/189 |
| 6,164,903 A * | 12/2000 | Kouris ....................... F01D 9/04 415/135 |
| 6,200,092 B1 | 3/2001 | Koschier |
| 6,325,593 B1 | 12/2001 | Darkins, Jr. et al. |
| 6,368,663 B1 | 4/2002 | Nakamura et al. |
| 6,514,046 B1 | 2/2003 | Morrison et al. |
| 6,558,114 B1 | 5/2003 | Tapley et al. |
| 6,648,597 B1 | 11/2003 | Widrig et al. |
| 6,884,030 B2 | 4/2005 | Darkins, Jr. et al. |
| 7,762,766 B2 | 7/2010 | Shteyman et al. |
| 7,824,152 B2 | 11/2010 | Morrison |
| 8,015,705 B2 | 9/2011 | Wilson, Jr. et al. |
| 8,206,098 B2 | 6/2012 | Prill et al. |
| 8,210,803 B2 | 7/2012 | Schaff et al. |
| 8,292,580 B2 | 10/2012 | Schiavo et al. |
| 8,454,303 B2 | 6/2013 | Garcia-Crespo |

(Continued)

*Primary Examiner* — Ninh H. Nguyen
(74) *Attorney, Agent, or Firm* — Barnes & Thornburg LLP

(57) ABSTRACT

Turbine vane assemblies incorporating both metallic and ceramic matrix composite materials are provided in the present disclosure. The turbine vane assemblies further include interface components that allow for differing rates of thermal expansion in the ceramic matrix composite components and the metallic components.

18 Claims, 6 Drawing Sheets

(56) References Cited

U.S. PATENT DOCUMENTS

| | | |
|---|---|---|
| 8,475,132 B2 | 7/2013 | Zhang et al. |
| 9,068,464 B2 | 6/2015 | Morrison et al. |
| 9,097,141 B2 | 8/2015 | Paradis |
| 9,546,557 B2 | 1/2017 | Grooms, III et al. |
| 9,915,159 B2 | 3/2018 | Huizenga et al. |
| 9,970,317 B2 | 5/2018 | Freeman et al. |
| 10,036,281 B2 * | 7/2018 | McCaffrey ............ F01D 25/246 |
| 10,174,627 B2 | 1/2019 | Chang et al. |
| 2012/0009071 A1 | 1/2012 | Tanahashi et al. |
| 2012/0057985 A1 | 3/2012 | Tanahashi et al. |
| 2014/0001285 A1 | 1/2014 | Grooms, III et al. |
| 2014/0255174 A1 | 9/2014 | Duelm et al. |
| 2016/0003072 A1 | 1/2016 | Chang et al. |
| 2016/0177761 A1 | 6/2016 | Huizenga et al. |
| 2016/0201488 A1 | 7/2016 | Carr et al. |
| 2016/0290147 A1 | 10/2016 | Weaver |
| 2017/0022833 A1 | 1/2017 | Heitman et al. |
| 2017/0051619 A1 | 2/2017 | Tuertscher |
| 2017/0298748 A1 | 10/2017 | Vetters et al. |
| 2018/0045117 A1 | 2/2018 | Groves, II et al. |
| 2018/0223680 A1 | 8/2018 | Hafner |
| 2018/0328187 A1 | 11/2018 | Oke |
| 2018/0340431 A1 | 11/2018 | Kerns et al. |
| 2018/0370158 A1 | 12/2018 | Gallier et al. |

\* cited by examiner

TURBINE VANE ASSEMBLY WITH CERAMIC MATRIX COMPOSITE COMPONENTS

FIELD OF THE DISCLOSURE

The present disclosure relates generally to vanes for gas turbine engines. More specifically, the present disclosure relates to vanes that are assembled from ceramic-containing and metallic components.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high temperature materials and/or to be actively cooled by supplying relatively cool air to the vanes and blades. To this end, some airfoils for vanes and blades are being made from composite materials adapted to withstand very high temperatures. Design and manufacture of vanes and blades from composite materials presents challenges because of the complex geometry and strength required for the parts.

SUMMARY

The present disclosure may comprise one or more of the following features and combinations thereof.

A turbine vane assembly for use in a gas turbine engine may include a ceramic matrix composite heat shield and a metallic support structure. The ceramic matrix composite heat shield is adapted to withstand high temperatures and comprising ceramic matrix composite materials. The metallic support structure extends radially through the ceramic matrix composite heat shield and may be used to mount the turbine vane assembly to other components of the gas turbine engine.

In some embodiments, the turbine vane assembly further includes interface components interconnecting the ceramic matrix composite heat shield and the metallic support structure. The interface components may allow for differing rates of thermal expansion in the ceramic matrix composite components and the metallic components.

In some embodiments, the ceramic matrix composite heat shield is shaped to include an inner end wall, an outer end wall spaced in a radial direction from the inner end wall to define a primary gas path therebetween, and an airfoil that extends from the inner end wall to the outer end wall.

In some embodiments, the metallic support structure includes a first plate arranged radially inward or radially outward of the ceramic matrix composite heat shield and a spar that extends radially from the first plate through the ceramic matrix composite heat shield. The metallic support structure may further include a second plate located radially inward of the inner end wall of the ceramic matrix composite heat shield that is fixed to a radially-inner end of the spar of the metallic support structure.

In some embodiments, the interface components include at least one bias spring arranged radially between the ceramic matrix composite heat shield and the first plate of the metallic support structure. The at least one bias spring may directly engage one of the outer end wall and the inner end wall of the ceramic matrix composite heat shield. Further, the at least one bias spring may directly engage the first plate.

In some embodiments, the interface components include a plurality of bias springs that each directly engages one of the outer end wall and the inner end wall of the ceramic matrix composite heat shield. Further, the plurality of bias springs may each directly engage the first plate.

In some embodiments, the interface components include a first collar that extends part-way into a cavity through the airfoil included in the ceramic matrix composite heat shield to transfer aerodynamic loads from the airfoil to surrounding components, a second collar that extends part-way into the cavity through the airfoil included in the ceramic matrix composite heat shield at a radially opposite end from the first collar to transfer aerodynamic loads from the airfoil to surrounding components, and at least one bias spring that directly engages one of the outer end wall and the inner end wall of the ceramic matrix composite heat shield. Further, the at least one bias spring may directly engage the panel of the first collar.

These and other features of the present disclosure will become more apparent from the following description of the illustrative embodiments.

DETAILED DESCRIPTION OF THE DRAWINGS

Figure 1:
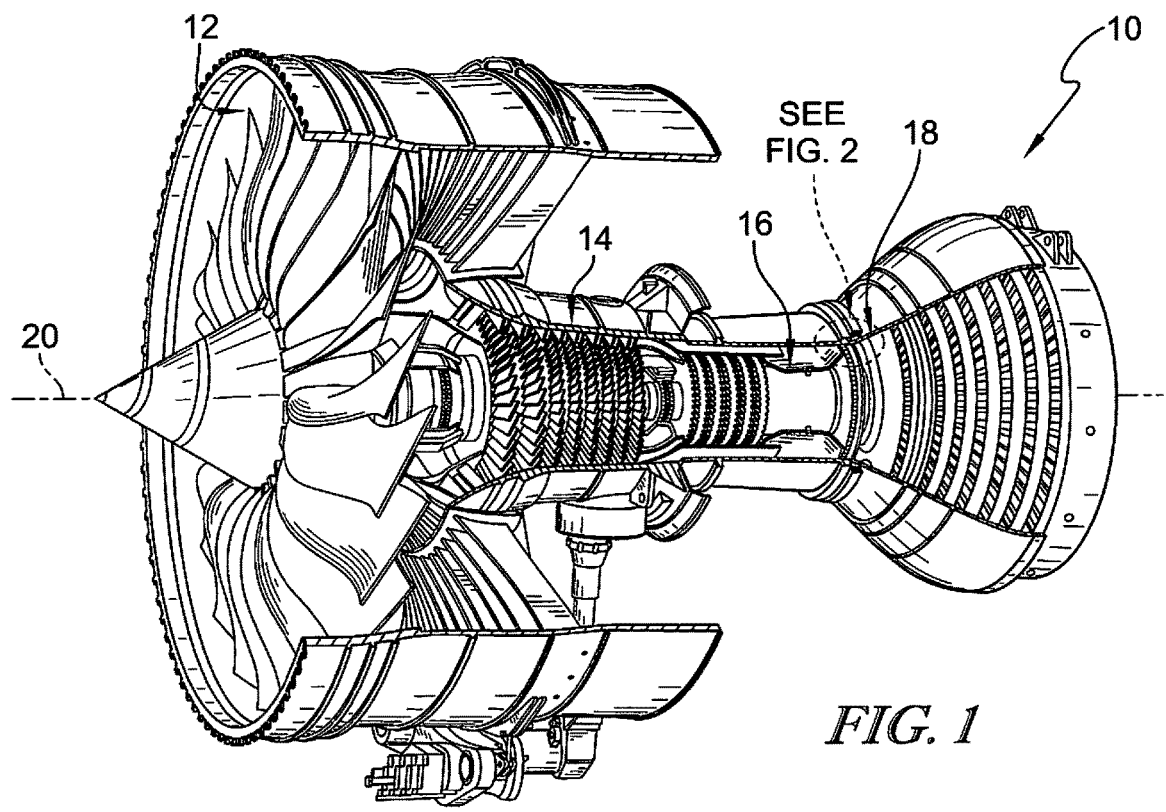
FIG. 1 is a perspective view of a gas turbine engine showing that the engine includes, from left to right, a fan, a compressor, a combustor and a a turbine arranged to receive hot, high pressure combustion products from the combustor.

For the purposes of promoting an understanding of the principles of the disclosure, reference will now be made to a number of illustrative embodiments illustrated in the drawings and specific language will be used to describe the same.

An illustrative aerospace gas turbine engine 10 is cutaway in FIG. 1 to show that the engine 10 includes a fan 12, a compressor 14, a combustor 16, and a turbine 18. The fan 12 is driven by the turbine 18 and provides thrust for propelling an air vehicle (not shown). The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 20 and drive the compressor 14 and the fan 12.

Figure 2:
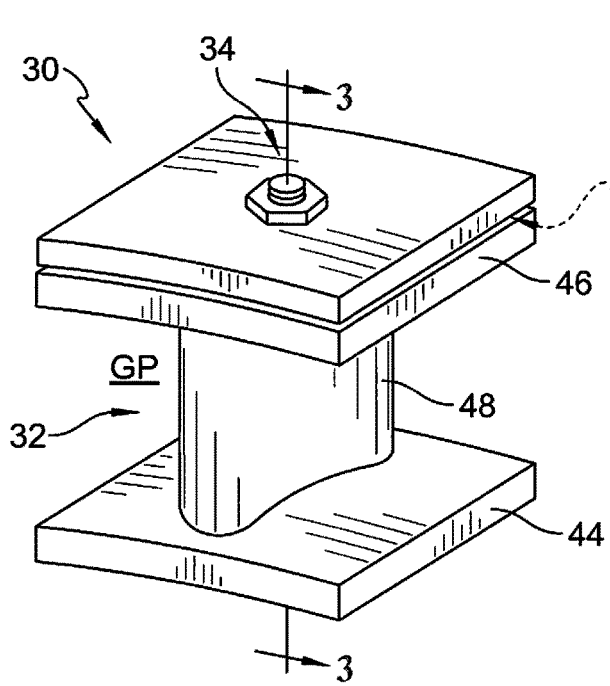
FIG. 2 is a perspective view of a turbine vane assembly adapted for use in the turbine of FIG. 1 adjacent to the combustor showing that the vane assembly includes an airfoil shaped to redirect hot, high pressure combustion products.

Referring now to FIG. 2, a turbine vane assembly 30 adapted for use with the turbine 18 is shown. The turbine vane assembly 30 includes a ceramic matrix composite heat shield 32 and a metallic support structure 34. The ceramic matrix composite heat shield 32 is made from materials suitable for direct interaction with temperatures driven by the hot, high-pressure products discharged from the combustor 16. The metallic support structure 34 is used to mount the vane assembly 30 to other components (turbine cases, rings, etc.) of the engine 10. While not shown, the metallic support structure 34 can include hangers, eyelets, connectors, and other features that support attachment to other metallic parts of the engine 10.

Figure 3:
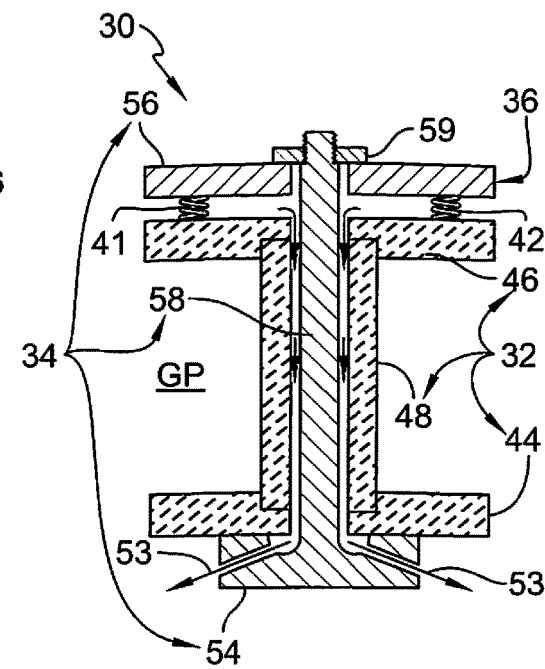
FIG. 3 is a cross-sectional view of the vane assembly of FIG. 2 showing that the vane assembly includes (i) a ceramic matrix composite heat shield made up of an airfoil, an outer end wall, and an inner end wall designed to interact with hot, high pressure combustion products, (ii) a metallic support structure configured to be coupled to other components within the turbine, and (iii) interface components that interconnect the ceramic matrix composite heat shield with the metallic support structure to allow for differing rates of thermal expansion in the ceramic matrix composite components and the metallic components while also radially biasing the heat shield toward a selected support structure component.
Figure 4:
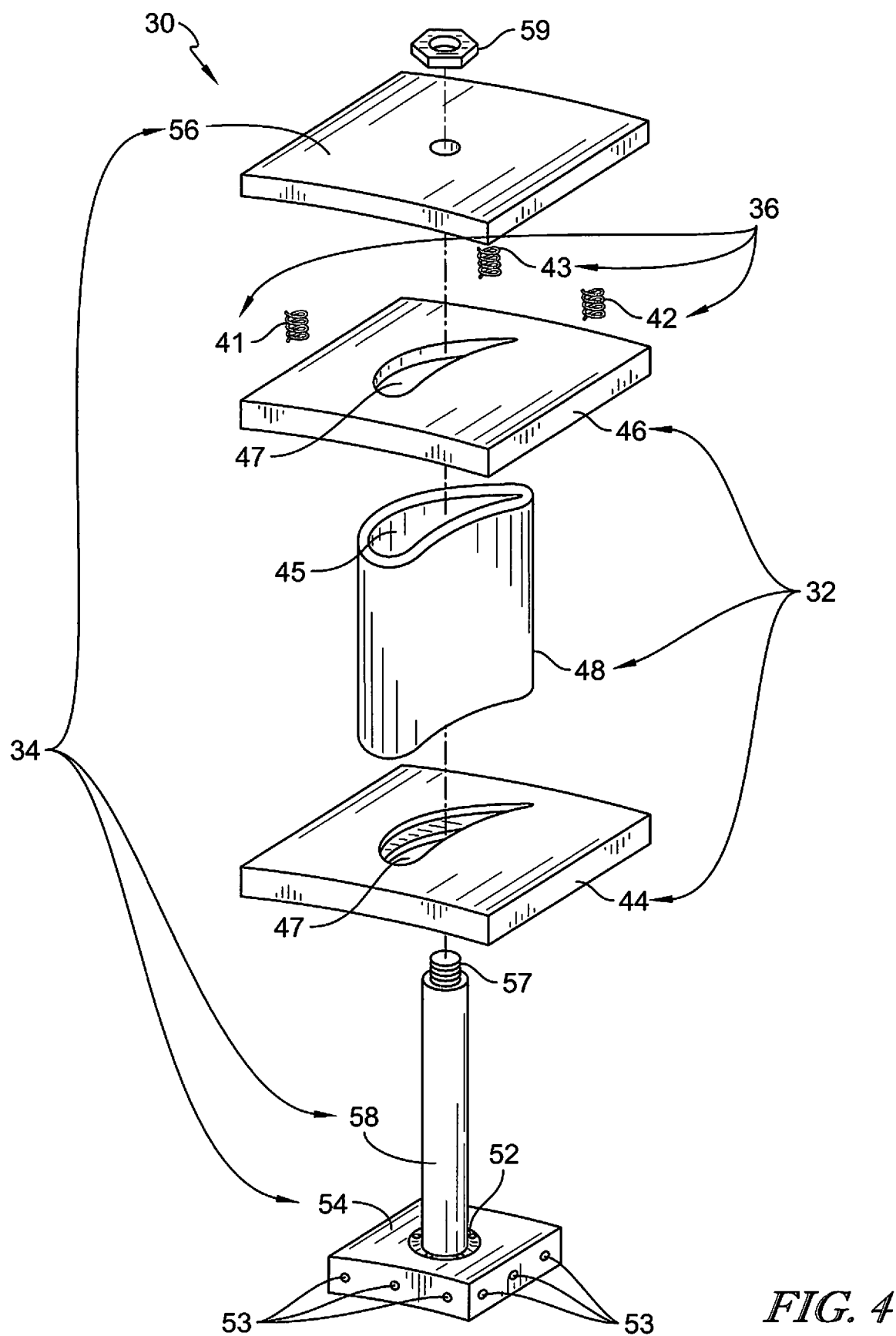
FIG. 4 is an exploded assembly view of the turbine vane assembly of FIGS. 2 and 3 showing that the metallic support structure includes a spar adapted to extend through the ceramic matrix composite heat shield and having an integrated inner plate, an outer plate with an aperture through which the spar extends, and a nut configured to engage a threaded outer end of the spar; and further showing that the interface components of the turbine vane assembly include a plurality of bias springs arranged between the outer end wall of the heat shield and the outer plate of the metallic support structure.

The vane assembly 30 also includes interface components 36 provided between the ceramic matrix composite heat shield 32 and the metallic support structure 34 as shown in FIGS. 2-4. The interface components 36 allow for differing rates of thermal expansion in the ceramic matrix composite heat shield 32 and the metallic support structure 34 that result in different amounts of growth when the vane assembly 30 is heated during use. In particular, ceramic matrix composite materials are understood to grow significantly less than metallic materials when heated up.

In the illustrated embodiment of FIGS. 2-4, the interface components 36 are provided by a plurality of bias springs 41, 42, 43. The bias springs 41, 42, 43 are located radially between the ceramic matrix composite heat shield 32 and the metallic support structure 34 to provide for thermal growth of the metallic support structure 34 greater than that of the ceramic matrix composite heat shield 32. In addition, the bias springs 41, 42, 43 support locating of the ceramic matrix composite heat shield 32 by pushing the heat shield in a known direction relative to the metallic support structure 34 during use in the engine 10.

Turning again to the ceramic matrix composite heat shield 32 shown in FIGS. 2-4, the heat shield 32 is made from ceramic matrix composite materials (such as silicon-carbide fibers in silicon-carbide matrix material) that is adapted for use at very high temperature. The heat shield 32 illustratively includes an inner end wall 44, an outer end wall 46, and an airfoil 48. The inner end wall 44 and the outer end wall 46 are spaced radially apart from one another and define a primary gas path GP therebetween. The airfoil 48 extends from the inner end wall 44 to the outer end wall 46 across the gas path GP. The airfoil 48 is shaped to interact with hot, high-pressure gasses moving through the turbine 18 to smooth out and direct flow of the gasses.

The inner end wall 44, the outer end wall 46, and the airfoil 48 of the embodiment shown in FIGS. 2-4 are illustratively separate components as shown in FIG. 4. In the illustrated embodiment, the parts 44, 46, 48 of the heat shield 32 may be coupled to one another by the metallic support structure 34 and/or the interface components 36. Optionally, a braze or other bond may be used to fix the parts 44, 46, 48 of the heat shield 34 together. Moreover, in other embodiments, the parts 44, 46, 48 of the heat shield 32 may be integrally formed as a single component via co-infiltration of matrix material as shown in the examples of FIGS. 5-7 and FIGS. 8-10.

The metallic support structure 34 illustratively extends radially through the ceramic matrix composite heat shield 34 as shown in FIG. 3. The metallic support structure 34 includes an inner plate 54, an outer plate 56, and a spar 58. The inner plate 54 is arranged radially inward of the ceramic matrix composite heat shield 32. The outer plate 56 is arranged radially outward of the ceramic matrix composite heat shield 32 and is coupled to the spar 58 by a threaded fastener (nut) 59. It is contemplated that the outer plate 56 may include various features for further coupling the vane assembly 30 to other parts of the engine 10. The spar 58 extends radially from the inner plate 54 to the outer plate 56 through the ceramic matrix composite heat shield 32.

The spar 58 is illustratively integral with the inner plate 54 such that the spar 58 and the inner plate 54 provide a single one-piece component as shown in FIG. 4. In other embodiments, the spar 58 may be independently formed and otherwise coupled or fixed to the inner plate 54. The spar 58 extends from the inner plate 54 through apertures 47 in the end walls 44, 46 and a cavity 45 in the airfoil 48 of the ceramic matrix composite heat shield 32. The spar 58 has threads 57 at an end opposite the inner plate 54 radially outward of the outer plate 56 that are engaged by the nut 59.

In another embodiment, the spar 58 may extend from the outer plate 56 through the apertures 47 in the end walls 44, 46 and a cavity 45 in the airfoil 48 of the ceramic matrix composite heat shield 32. The spar 58 may have threads 57 at an end opposite the outer plate 56 radially outward of the inner plate 54 that are engaged by the nut 59. In the illustrative embodiment, the spar 58 has a cylindrical cross-sectional shape but may have form rectangular, ovular, triangular, or any other suitable cross-sectional shape.

Notably, the inner plate 54 is shaped to include a trough 52 formed around the spar 58 as shown in FIG. 4. The trough 52 is in fluid communication with the cavity 45 of the airfoil 48 included in the ceramic matrix composite heat shield 32. Cooling air passageways 53 extend from the trough 52 through the inner plate 54 and can conduct cooling air into/out of the cavity 45. In other embodiments, the inner plate 54 may not include the trough 52 and the cooling air passageways 53 may be located in a gap between the spar 58 and the cavity 47.

Bias springs 41, 42, 43 that provide the interface components 36 in the embodiment shown in FIGS. 2-4 are illustratively made from a high temperature nickel alloy. The bias springs 41, 42, 43 each engage the outer end wall 46 of the ceramic matrix composite heat shield 32 and the outer plate 56 of the metallic support structure 34. The bias springs 41, 42, 43 are illustratively coil springs but could be leaf springs, wave springs, ceramic springs such as SiN, or other suitable biasing members. In other embodiments, the bias springs 41, 42, 43 may instead be an "E" type seal arranged along either a perimeter of the cavity 47, a perimeter of the outer end wall 46, both the perimeter of the cavity 47 and the outer end wall 46, or anywhere inbetween. The "E: type seal may serve as both a biasing element and a sealing element. In some embodiments a single bias spring may be used or included that extends around the spar 58 outside the gas path GP.

Figure 5:
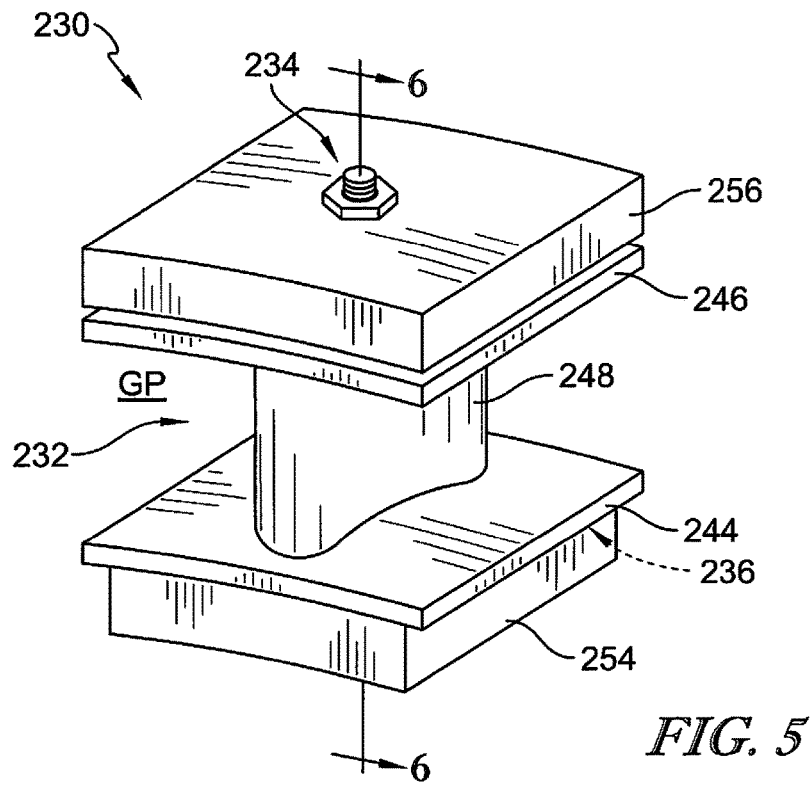
FIG. 5 is a perspective view of a second turbine vane assembly adapted for use in the turbine of FIG. 1 with an airfoil shaped to redirect hot, high pressure combustion products.
Figure 6:
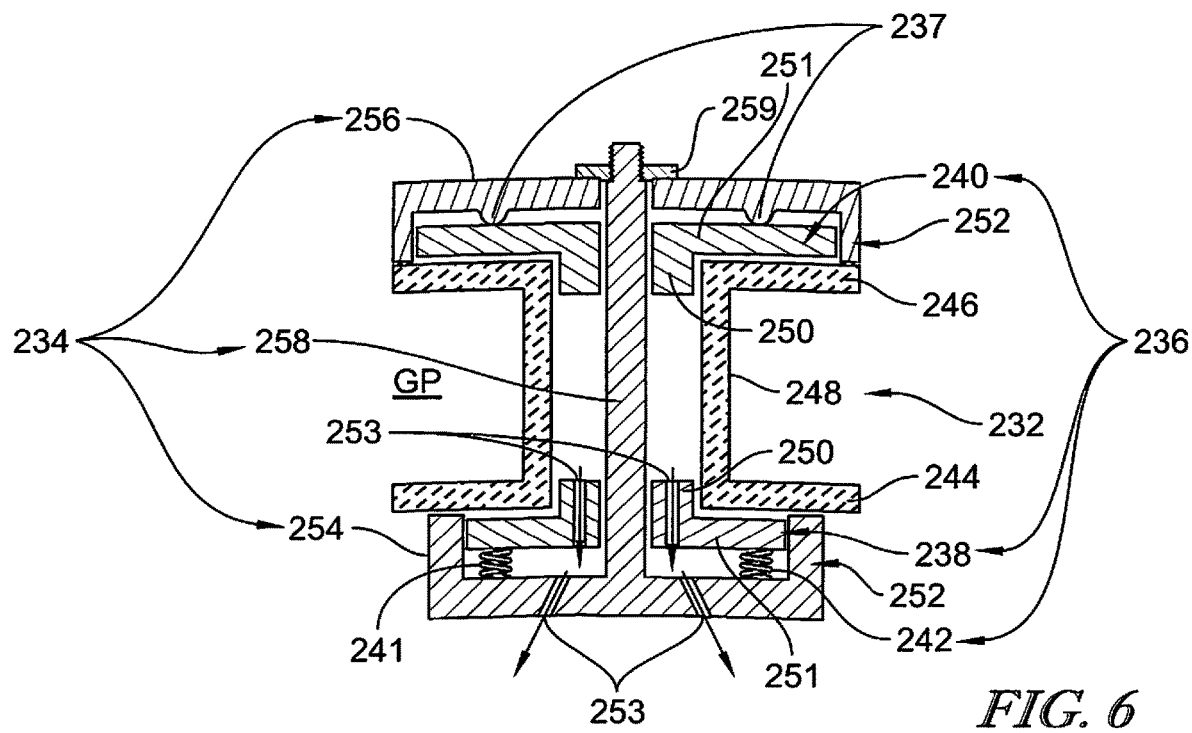
FIG. 6 is a cross-sectional view of the vane assembly of FIG. 5 showing that the vane assembly includes (i) a ceramic matrix composite heat shield that provides the airfoil, an outer end wall, and an inner end wall, (ii) a metallic support structure, and (iii) interface components that interconnect the ceramic matrix composite heat shield with the metallic support structure to allow for differing rates of thermal expansion in the ceramic matrix composite components and the metallic components while also biasing the location of the heat shield.
Figure 7:
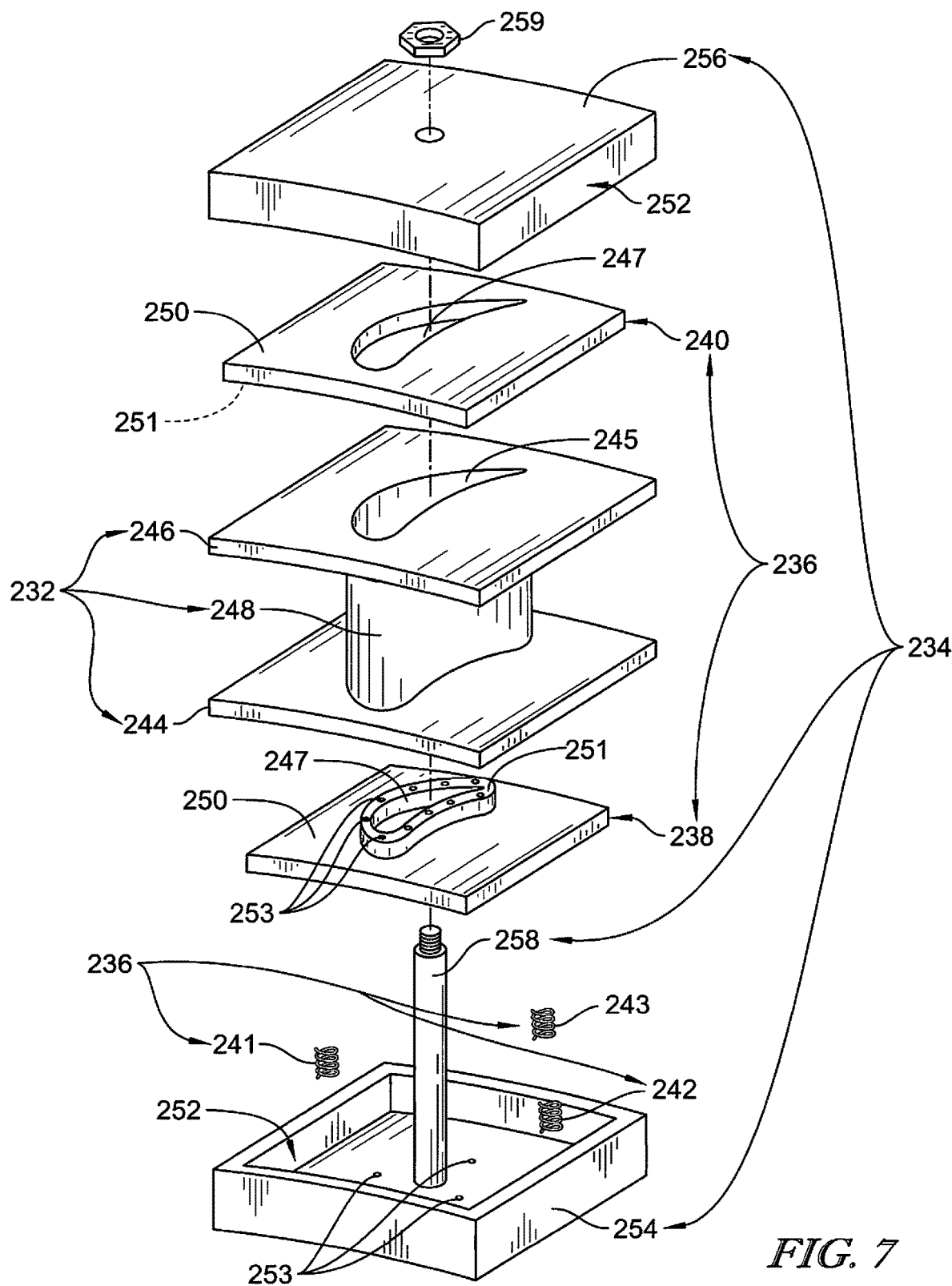
FIG. 7 is an exploded assembly view of the turbine vane assembly of FIGS. 5 and 6 showing that the metallic support structure includes a spar adapted to extend through the ceramic matrix composite heat shield and having an integrated inner plate, an outer plate with an aperture through which the spar extends, and a nut configured to engage a threaded outer end of the spar; and further showing that the interface components of the turbine vane assembly includes inner and outer collars that extend into the airfoil to transfer aero loads from the airfoil along with a plurality of bias springs arranged between the inner collar and the inner plate incorporated into the spar.

In another illustrative embodiment, a second turbine vane assembly 230 adapted for use with the turbine 18 is shown in FIGS. 5-7. The turbine vane assembly 230 includes a ceramic matrix composite heat shield 232 and a metallic support structure 234. The ceramic matrix composite heat shield 232 is made from materials suitable for direct interaction with temperatures driven by the hot, high-pressure products discharged from the combustor 16. The metallic support structure 234 is used to mount the vane assembly 230 to other components (turbine cases, rings, etc.) of the engine 10. While not shown, the metallic support structure 234 can include hangers, eyelets, connectors, and other features that support attachment to other metallic parts of the engine 10.

The vane assembly 230 also includes interface components 236 provided between the ceramic matrix composite heat shield 232 and the metallic support structure 234 as shown in FIGS. 6 and 7. The interface components 236 allow for differing rates of thermal expansion in the ceramic matrix composite heat shield 232 and the metallic support structure 234 that result in different amounts of growth when the vane assembly 230 is heated during use. In particular, ceramic matrix composite materials are understood to grow significantly less than metallic materials when heated up.

The ceramic matrix composite heat shield 232 shown in FIGS. 5-7, the heat shield 232 is made from ceramic matrix composite materials (such as silicon-carbide fibers in silicon-carbide matrix material) that is adapted for use at very high temperature. The heat shield 232 illustratively includes an inner end wall 244, an outer end wall 246, and an airfoil 248. The inner end wall 44 and the outer end wall 46 are spaced radially apart from one another and define a primary gas path GP therebetween. The airfoil 248 extends from the inner end wall 244 to the outer end wall 246 across the gas path GP. The airfoil 248 is shaped to interact with hot, high-pressure gasses moving through the turbine 18 to smooth out and direct flow of the gasses.

The inner end wall 244, the outer end wall 246, and the airfoil 248 of the embodiment shown in FIGS. 5-7 is an illustratively integral component as shown in FIG. 4. In the illustrative embodiment, the parts 244, 246, 248 of the heat shield 232 are integrally formed as a single component via co-infiltration of matrix material. In other embodiments, the parts 244, 246, 248 of the heat shield 232 may be separate components coupled to one another by the metallic support structure 234 and/or the interface components 236 as shown in the examples of FIGS. 2-4.

The metallic support structure 234 illustratively extends radially through the ceramic matrix composite heat shield 234 as shown in FIG. 6. The metallic support structure 234 includes an inner plate 254, an outer plate 256, and a spar 258. The inner plate 254 is arranged radially inward of the ceramic matrix composite heat shield 232. The outer plate 256 is arranged radially outward of the ceramic matrix composite heat shield 232 and is coupled to the spar 258 by a threaded fastener (nut) 259. It is contemplated that the outer plate 256 may include various features for further coupling the vane assembly 230 to other parts of the engine 10. The spar 258 extends radially from the inner plate 254 to the outer plate 256 through the ceramic matrix composite heat shield 232.

The spar 258 is illustratively integral with the inner plate 254 such that the spar 258 and the inner plate 254 provide a single one-piece component as shown in FIG. 7. In other embodiments, the spar 258 may be independently formed and otherwise coupled or fixed to the inner plate 254. The spar 258 extends from the inner plate 254 through apertures 247 in collars 238, 240 of the interface components 236 and a cavity 245 in the airfoil 248 of the ceramic matrix composite heat shield 232. The spar 258 has threads 257 at an end opposite the inner plate 254 radially outward of the outer plate 256 that are engaged by the nut 259.

In another embodiment, the spar 258 may extend from the outer plate 256 through the apertures 247 in the end walls 244, 246 and a cavity 245 in the airfoil 248 of the ceramic matrix composite heat shield 232. The spar 258 may have threads 257 at an end opposite the outer plate 256 radially outward of the inner plate 254 that are engaged by the nut 259. In the illustrative embodiment, the spar 258 has a cylindrical cross-sectional shape but may have form rectangular, ovular, triangular, or any other suitable cross-sectional shape.

Cooling air passageways 253 extend through the first collar 238 and the trough 252 as shown in FIG. 7. The cooling air passageways 253 can carry cooling air to/from the cavity 245 of the airfoil 248. In other embodiments, the inner plate 254 may not include the trough 252 and the cooling air passageways 253 may be located in a gap between the spar 258 and the cavity 247.

The interface components 236 are provided by a plurality of bias springs 241, 242, 243, a first collar 238, and a second collar 240 as shown in FIGS. 5-7. The bias springs 241, 242, 243 are located radially between the ceramic matrix composite heat shield 232 and the metallic support structure 234 to provide for thermal growth of the metallic support structure 234 greater than that of the ceramic matrix composite heat shield 232. In addition, the bias springs 241, 242, 243 support locating of the ceramic matrix composite heat shield 232 by pushing the heat shield in a known direction relative to the metallic support structure 234 during use in the engine 10.

The first collar 238 extends part-way into the cavity 245 through the airfoil 248 included in the ceramic matrix composite heat shield 232 to transfer aerodynamic loads from the airfoil to surrounding components. The second collar 240 extends part-way into the cavity 245 through the airfoil 248 included in the ceramic matrix composite heat shield 232 at a radially opposite end from the first collar 238 to transfer aerodynamic loads from the airfoil 248 to surrounding components. In some embodiments, the second collar 240 may be formed integrally with the outer plate 256 of the metallic support structure to form a single piece component.

Additionally, in the illustrative embodiment of FIGS. 5-7, the interface components 236 are further provided by a plurality of load pads 237. The load pads 237 are configured to carry the aerodynamic load to the support structure 334. Illustratively, the load pads 237 are included in the outer plate 256 of the metallic support structure 234. In some embodiments, the spar 258 may include load pads 337 to transfer the side load from the heat shield 232 to the support structure 334.

The first collar 238 and the second collar 240 are both shaped to include a sleeve 250 and a panel 251 as shown in FIGS. 6 and 7. The sleeve 250 extends into the cavity 245. The panel 251 extends outwardly away from the sleeve 250 outside the cavity 245.

Figure 9:
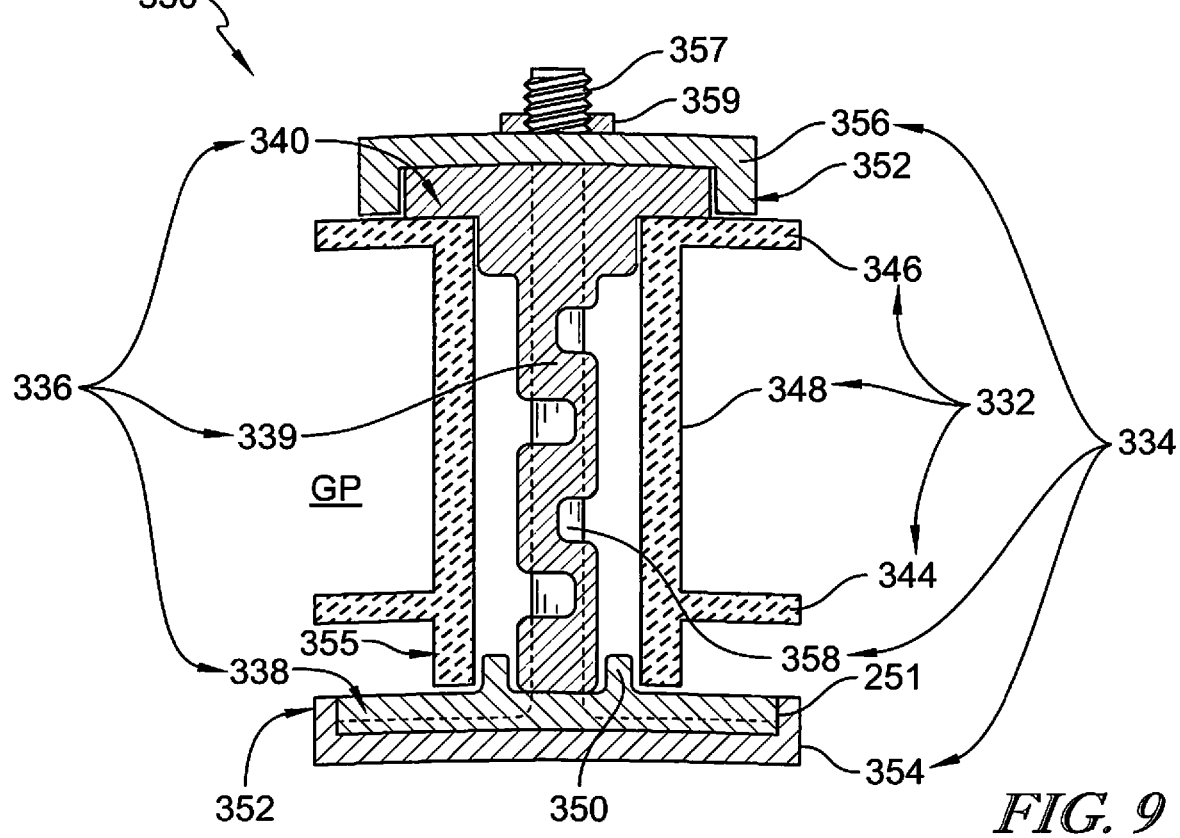
FIG. 9 is a cross-sectional view of the vane assembly of FIG. 8 showing that the vane assembly includes (i) a ceramic matrix composite heat shield that provides the airfoil, an outer end wall, and an inner end wall, (ii) a metallic support structure, and (iii) interface components that interconnect the ceramic matrix composite heat shield with the metallic support structure to allow for differing rates of thermal expansion in the ceramic matrix composite components and the metallic components while also biasing the location of the heat shield.

The first collar 238 (or inner collar) illustratively extends into an extension 355 of the airfoil 348 outside the primary gas path GP as shown in FIG. 9. The extension 355 of the airfoil 348 extends radially past the corresponding end wall 344 included in the heat shield 332 to a location cooler than that inside the gas path GP. It is contemplated that a similar extension could be employed at the radially outer end of the airfoil 348 as well to move engagement with the second collar 240 primarily or wholly outside the gas path GP.

Notably, the inner plate 254 and outer plate 256 are shaped to include a shoulder 252 as shown in FIGS. 6 and 7. The shoulders 252 engage corresponding collars 238, 240 to transfer aerodynamic loading from the collars 238, 240 to other engine components when the vane 230 is mounted in an engine.

In the illustrative embodiment, the bias springs 241, 242, 243 directly engage the panel 251 of the first collar 238 and the inner plate 254 of the support structure 234. In other embodiments, the bias springs 241, 242, 243 may each engage the panel 251 of the first collar 238 and the inner end wall 244 of the ceramic matrix composite heat shield 232. In other embodiments, the bias springs 241, 242, 243 may each engage the inner end wall 244 of the ceramic matrix composite heat shield 232 and the inner plate 254 of the metallic support structure 234.

Bias springs 241, 242, 243 that provide the interface components 236 in the embodiment shown in FIGS. 5-7 are illustratively made from a high temperature nickel alloy. The bias springs 241, 242, 243 are illustratively coil springs but could be leaf springs, wave springs, ceramic springs such as SiN, or other suitable biasing members. In some embodiments a single bias spring may be used or included that extends around the spar 258 outside the gas path GP. In other embodiments, the bias springs 241, 242, 243 may instead be an "E" type seal arranged along either a perimeter of the cavity 247, a perimeter of the outer end wall 246, both the perimeter of the cavity 247 and the outer end wall 246, or anywhere in-between. The "E: type seal may serve as both a biasing element and a sealing element.

The bias springs 241, 242, 243 are arranged as to isolate the bias springs 241, 242, 243 from the hot ceramic matrix composite material and allow for a secondary flow system that would isolate the bias springs 241, 242, 243 that provide the interface components 236. Thermally isolating the bias springs 241, 242, 243 limits the stress relation within the bias springs 241, 242, 243. If the stress relation within the bias springs 241, 242, 243 were not limited, then the bias springs 241, 242, 243 would lose function over time.

In another embodiment, the bias springs 241, 242, 243 may directly engage the panel 251 of the second collar 240 and the outer plate 256 of the support structure 234. In other embodiments, the bias springs 241, 242, 243 may each engage the panel 251 of the second collar 240 and the outer end wall 246 of the ceramic matrix composite heat shield 232. In other embodiments, the bias springs 241, 242, 243 may each engage the outer end wall 246 of the ceramic matrix composite heat shield 232 and the outer plate 256 of the metallic support structure 234. Additionally, the inner plate 254 may include the load pads 237 and the first collar 238 may be formed integrally with the inner plate 254 of the metallic support structure 234 to form a single piece component.

Figure 8:
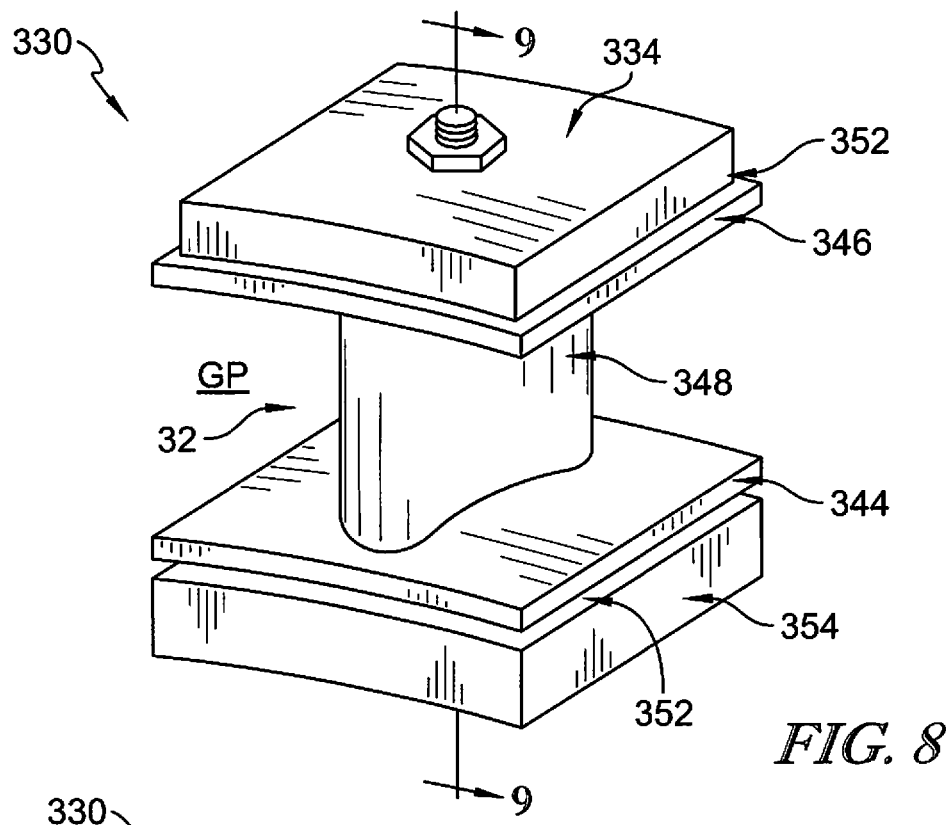
FIG. 8 is a perspective view of a third turbine vane assembly adapted for use in the turbine of FIG. 1 with an airfoil shaped to redirect hot, high pressure combustion products.
Figure 10:
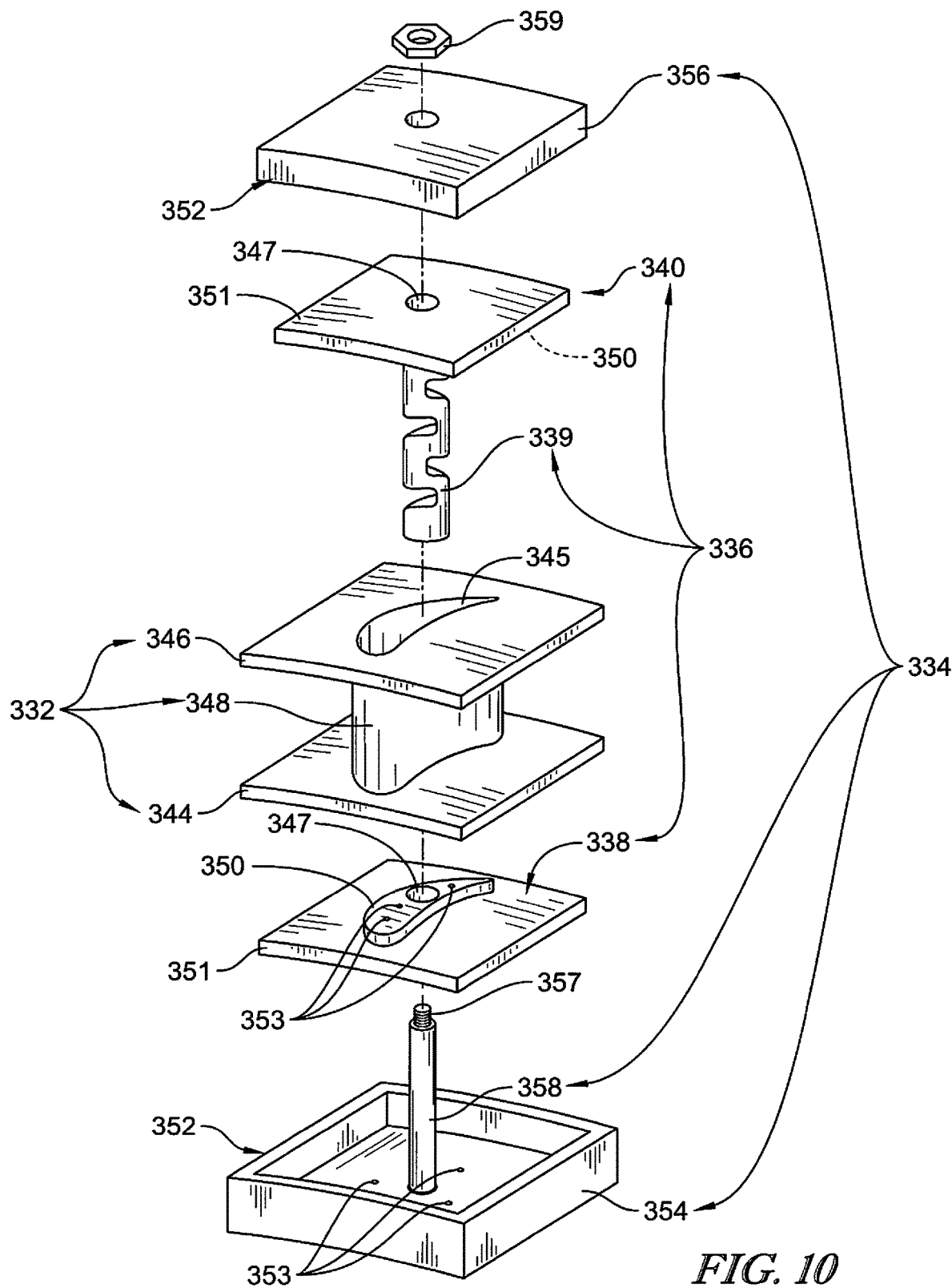
FIG. 10 is an exploded assembly view of the turbine vane assembly of FIGS. 8 and 9 showing that the metallic support structure includes a spar adapted to extend through the ceramic matrix composite heat shield and having an integrated inner plate and a nut configured to engage a threaded outer end of the spar; and further showing that the interface components of the turbine vane assembly includes inner and outer collars that extend into the airfoil to transfer aero loads from the airfoil along with a bias tube that extends from the outer collar to the inner collar coaxially around the spar.

In another illustrative embodiment, a third turbine vane assembly 330 adapted for use with the turbine 18 is shown in FIGS. 8-10. The turbine vane assembly 330 includes a ceramic matrix composite heat shield 332 and a metallic support structure 334. The ceramic matrix composite heat shield 332 is made from materials suitable for direct interaction with temperatures driven by the hot, high-pressure products discharged from the combustor 16. The metallic support structure 334 is used to mount the vane assembly 330 to other components (turbine cases, rings, etc.) of the engine 10. While not shown, the metallic support structure 334 can include hangers, eyelets, connectors, and other features that support attachment to other metallic parts of the engine 10.

The vane assembly 330 also includes interface components 336 provided between the ceramic matrix composite heat shield 332 and the metallic support structure 334 as shown in FIGS. 9 and 10. The interface components 336 allow for differing rates of thermal expansion in the ceramic matrix composite heat shield 332 and the metallic support structure 334 that result in different amounts of growth when the vane assembly 330 is heated during use. In particular, ceramic matrix composite materials are understood to grow significantly less than metallic materials when heated up. The interface components 336 are also configured to that interconnect the ceramic matrix composite heat shield 332 with the metallic support structure 334.

The ceramic matrix composite heat shield 332 shown in FIGS. 8-10, the heat shield 332 is made from ceramic matrix composite materials (such as silicon-carbide fibers in silicon-carbide matrix material) that is adapted for use at very high temperature. The heat shield 332 illustratively includes an inner end wall 344, an outer end wall 346, and an airfoil 348. The inner end wall 344 and the outer end wall 346 are spaced radially apart from one another and define a primary gas path GP therebetween. The airfoil 348 extends from the inner end wall 344 to the outer end wall 346 across the gas path GP. The airfoil 348 is shaped to interact with hot, high-pressure gasses moving through the turbine 18 to smooth out and direct flow of the gasses.

The inner end wall 344, the outer end wall 346, and the airfoil 348 of the embodiment shown in FIGS. 8-10 is an illustratively integral component as shown in FIG. 10. In the illustrative embodiment, the parts 344, 346, 348 of the heat shield 332 are integrally formed as a single component via co-infiltration of matrix material. Moreover, in other embodiments, the parts 344, 346, 348 of the heat shield 332 may be separate components coupled to one another by the metallic support structure 334 and/or the interface components 336 as shown in the examples of FIGS. 2-4.

The metallic support structure 334 illustratively extends radially through the ceramic matrix composite heat shield 334 as shown in FIG. 9. The metallic support structure 334 includes an inner plate 354, an outer plate 356, and a spar 358. The inner plate 354 is arranged radially inward of the ceramic matrix composite heat shield 332. The outer plate 356 is arranged radially outward of the ceramic matrix composite heat shield 332 and is coupled to the spar 358 by a threaded fastener (nut) 359. It is contemplated that the outer plate 356 may include various features for further coupling the vane assembly 330 to other parts of the engine 10. The spar 358 extends radially from the inner plate 354 to the outer plate 356 through the ceramic matrix composite heat shield 332.

The spar 358 is illustratively integral with the inner plate 354 such that the spar 358 and the inner plate 354 provide a single one-piece component as shown in FIG. 10. In other embodiments, the spar 358 may be independently formed and otherwise coupled or fixed to the inner plate 354. The spar 358 extends from the inner plate 354 through apertures 347 in collars 338, 340 of the interface components 336 and a cavity 345 in the airfoil 348 of the ceramic matrix composite heat shield 332. The spar 358 has threads 357 at an end opposite the inner plate 354 radially outward of the outer plate 356 that are engaged by the nut 359. In the illustrative embodiment, the spar 358 has a cylindrical cross-sectional shape but may have form rectangular, ovular, triangular, or any other suitable cross-sectional shape.

Cooling air passageways 353 can extend through the first collar 338 and through the inner plate 354 as shown in FIG. 10. These passageways 353 and can conduct cooling air into/out of the cavity 345. In other embodiments, the cooling air passageways 353 may be located in a gap between the spar 358 and the cavity 347.

In the illustrative embodiment of FIGS. 8-10, the interface components 336 include a first collar 338, a second collar 340, and a bias member 339. The first collar 338 is arranged radially between the metallic support structure 334 and the ceramic matrix composite heat shield 332. The second collar 340 is arranged so that the ceramic matrix composite heat shield 332 is radially between the first collar 338 and the second collar 340. The bias member 339 extends from the first collar 338 to the second collar through the cavity 345 of the airfoil 348 included in the ceramic matrix composite heat shield 332. The bias member 339 is co-axial with the spar 358 of the metallic support structure 334.

Additionally, the first collar 338 extends part-way into the cavity 345 through the airfoil 348 included in the ceramic matrix composite heat shield 332 to transfer aerodynamic loads from the airfoil 348 to surrounding components. The second collar 340 extends part-way into the cavity 345 through the airfoil 348 included in the ceramic matrix composite heat shield 332 at a radially opposite end from the first collar 338 to transfer aerodynamic loads from the airfoil 348 to surrounding components.

The first collar 338 and the second collar 340 are both shaped to include a sleeve 350 and a panel 351 as shown in FIGS. 9 and 10. The sleeve 350 extends into the cavity 345. The panel 351 extends outwardly away from the sleeve 350 outside the cavity 345.

Notably, the inner plate 354 and outer plate 356 are shaped to include a shoulder 352 as shown in FIG. 9. The shoulders 352 engage corresponding collars 338, 340 to transfer aerodynamic loading from the collars 338, 340 to other engine components when the vane 330 is mounted in an engine.

Bias member 339 that provides the interface component 236 in the embodiment shown in FIGS. 8-10 is illustratively made from a high temperature nickel alloy. In other embodiments, the bias member 339 may engage the outer end wall 346 of the ceramic matrix composite heat shield 332 and the outer plate 356 of the metallic support structure 334. The bias member 339 illustratively a coil spring but could be a leaf spring, wave spring, or other suitable biasing member.

One challenge of designing and developing a ceramic matrix composite vane is how to mount the vanes in the gas turbine engine and how to transfer loads from the gas turbine gas path surfaces through the ceramic matrix composite vane to the surrounding structure. The inherently low stress allowable and low coefficient of thermal expansion compared to metals can lead to relative thermal growth differences in the assembly which can easily lead to fretting, wear, high frictional loading, etc.

The present disclosure provides a supporting metal structure for load transfer while experiencing little to no relative movement between the ceramic matrix composite components and the metallic components. All relative movement would be through metal to metal joints in a lower temperature location, allowing for conventional standard metal design practice.

The ceramic matrix composite airfoil and platform may be a single airfoil with platforms or multiple airfoils with platforms. The platforms can be integral with the airfoil. One method of making the airfoil and platforms can be fully integrating the airfoil and platforms through the whole process. Other methods may include wherein the airfoil and platforms are coprocessed through slurry infiltration and melt infiltration processes, coprocessed through melt infiltration process only, or joined after fully processing by a brazing or welding process.

Alternatively, or in part, the platforms can be separate pieces with a tight fit joint and load transfer features to carry side load from the airfoil and radial load. It should be noted that the tight fit joint is not an interference joint. The tight fit joint could incorporate seal or sealing features to limit the amount of air leakage to and from the gas path. The seal may be a ceramic rope seal captured in a cavity, a high temperature gasket material radially compressed between the end of the airfoil and the platform, or a metallic seal like the metallic collars in the illustrative embodiment of the present disclosure compressed between the airfoil and the platform opening.

The support structure may include a metal rod or spar passing through the middle of the ceramic matrix composite vane. The rod or spar may have a wider head against which the other components are loaded. The head may be either an integral part of the spar or rod. In other embodiments, the head may be assembled to the spar or rod permanently or removeably.

The features for transferring side loads from the airfoil to the supporting structure may be formed to include minimal metallic interfaces. For example, the metallic collars at the end of the airfoils could be removed or omitted. Instead, the spar or rod can incorporate load pads that are configured to transfer side loads from the airfoil to the supporting structure. In the embodiments including the metallic collars at the ends of the airfoil, the airfoil would transfer loads into the metallic collars which in turn transfer the side loads into the spar or rod. The metallic collar to airfoil interface may be a tight fit joint and may also be circular in shape. However, the tight fit joint may be another suitable shape.

A high temperature spring or springs may be used to place the entire assembly in compression throughout the operating envelope. The spring(s) may be a high temperature nickel alloy helical compression spring, for example an X750 spring, a monolithic ceramic spring, a stack of high temperature nickel ally Bellville washers, or a high temperature nickel alloy machined spring. Machined springs are an established technology and may help with packaging.

In other embodiments, the spring(s) may be a compression spring outside of the airfoil. In another embodiment, the spring may be a tension spring inside the internal cavity of the airfoil. If a machined spring is implemented, the spring may be a separate piece or integral to some of the metallic components. For example, the embodiment of FIGS. 8-10 shows how the spring can be integral with one of the metallic collars and assembled to the other metallic collar by either a threaded protrusion through the assembled collar piece and a nut, a bolt through the collar pieces into the threaded end of the rod, or a pin passing through the collar piece and the rod. Alternatively, an externally mounted machined spring can be made integral with a collar piece or the piece against which the spring reacts load.

The spring(s) may be located in optimal locations for thermal management to limit stress relation in the spring. In particular, the spring(s) may be kept away from the highest temperature areas and the secondary flow circuit can be used to thermally manage the spring.

The metallic spar is fixed to the engine by features which the high temperature spring reacts load. The feature that fixed the spar to the engine may be the engine casing. The spar may be grounded to the engine casing while the spring may be contained by a collar and retaining ring. In other embodiments, the casing itself may be reacting the spring. In this embodiment, a central rod passes through the case and is fastened on the outside of the case. Another embodiment may integrate the spring into the metallic cover pieces and the other opposite cover piece can react the spring load. The spar or rod may then be grounded to the engine structure or case.

As gas turbine engine cases are pressure vessels, a seal is included in the joint. The seal may be a radially energized "C" seal in a counter bore on the outside of the case with the retaining ring backing the "C" seal. However, another seal arrangement may be having a step or shoulder on the end of the rod that interfaces the inside of the case and threading a nut onto the end of the rod against the outside of the case, or other suitable seal arrangement may be used.

Incorporating interface components such as bias springs 41, 42, 43, 241, 243, 242 and the bias element 339 minimizes the loads transferred through the airfoil since the loads like bending loads are transferred through the metallic support structure. Transferring the loads to the metallic support structure also reduces the stresses in the ceramic matrix composite materials.

The interface components also direct the relative motion away from the ceramic matrix component components and ceramic matrix composite interfaces with the metallic support structure. The relative motion areas are concentrated in metal to metal interfaces so that wear and fretting cane be managed in conventional manners. Concentrating the relative motion to only metal on metal interfaces can direct the relative motion in areas further away from the highest temperature areas which in turn opens up the option for thermally managing the high temperature areas to optimize durability and reliability. The high temperature areas can be thermally managed in such a way as to avoid structural issues such as creep or stress rupture of the components. Lastly, minimizing the ceramic matrix composite to metal interfaces also reduced potential chemical reactions between the materials such as nickel alloy embrittlement.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane assembly, the assembly comprising
a ceramic matrix composite heat shield adapted to withstand high temperatures, the ceramic matrix composite heat shield shaped to include an inner end wall, an outer end wall spaced in a radial direction from the inner end wall to define a primary gas path therebetween, and an airfoil that extends from the inner end wall to the outer end wall,
a metallic support structure that extends radially through the ceramic matrix composite heat shield, the metallic support structure including a first plate arranged radially inward or radially outward of the ceramic matrix composite heat shield and a spar that extends radially from the first plate through the ceramic matrix composite heat shield, and
interface components configured to interconnect and to allow for differing rates of thermal expansion between the ceramic matrix composite heat shield and the metallic support structure, the interface components including at least one bias spring arranged radially between the ceramic matrix composite heat shield and the first plate of the metallic support structure,
wherein the interface components include a first collar that extends part-way into a cavity though the airfoil included in the ceramic matrix composite heat shield to transfer aerodynamic loads from the airfoil to surrounding components.

2. The assembly of claim 1, wherein the at least one bias spring directly engages one of the outer end wall and the inner end wall of the ceramic matrix composite heat shield, and the at least one bias spring directly engages the first plate.

3. The assembly of claim 2, wherein the interface components include a plurality of bias springs that each directly engages one of the outer end wall and the inner end wall of the ceramic matrix composite heat shield, and each of the plurality of bias springs directly engages the first plate.

4. The assembly of claim 2, wherein the first plate is located radially outward of the outer end wall included in the ceramic matrix composite heat shield.

5. The assembly of claim 4, wherein the metallic support structure includes a second plate located radially inward of the inner end wall of the ceramic matrix composite heat shield, and the second plate is fixed to a radially-inner end of the spar of the metallic support structure.

6. The assembly of claim 5, wherein the second plate is formed to include at least one cooling air passage in fluid communication with an interior cavity formed by the airfoil of the ceramic matrix composite heat shield.

7. The assembly of claim 1, wherein the first collar is shaped to include a sleeve that extends into the cavity and a panel that extends outwardly away from the sleeve outside the cavity.

8. The assembly of claim 7, wherein the at least one bias spring directly engages one of the outer end wall and the inner end wall of the ceramic matrix composite heat shield, and the at least one bias spring directly engages the panel of the first collar.

9. The assembly of claim 7, wherein the first collar is formed to include cooling air passageways that extend through both the sleeve and the panel to provide fluid communication into the cavity.

10. The assembly of claim 7, wherein the interface components include a second collar that extends part-way into the cavity through the airfoil included in the ceramic matrix composite heat shield at a radially opposite end from the first collar to transfer aerodynamic loads from the airfoil to surrounding components, and the second collar is shaped to include a sleeve that extends into the cavity and a panel that extends outwardly away from the sleeve outside the cavity.

11. The assembly of claim 1, wherein the first collar is shaped to form a sleeve that extends into the cavity of the airfoil and a panel arranged outside the cavity that extends away from the sleeve.

12. The assembly of claim 11, wherein the plurality of bias springs directly engage the panel of the first collar and the first plate of the metallic support structure.

13. A turbine vane assembly, the assembly comprising
a ceramic matrix composite heat shield including an airfoil that extends radially across a primary gas path and at least one end wall that defines a radial boundary of the primary gas path,
a metallic support structure including a spar that extends radially through the airfoil and a first plate fixed to the spar outside the airfoil,
a plurality of bias springs arranged radially between the at least one end wall of the ceramic matrix composite heat shield and the first plate of the metallic support structure, and
a first collar that extends partway into a cavity that extends radially through the airfoil around the spar and that contacts an interior side of the airfoil.

14. The assembly of claim 13, wherein the plurality of bias springs directly engage the at least one end wall of the ceramic matrix composite heat shield and the first plate of the metallic support structure.

15. The assembly of claim 14, wherein the metallic support structure includes a second plate coupled to the spar outside the airfoil with the airfoil and the at least one end wall of the ceramic matrix composite heat shield located radially between the first plate and the second plate of the metallic support structure.

16. The assembly of claim 15, wherein the at least one end wall of the ceramic matrix composite heat shield includes a first end wall and a second end wall, the first end wall arranged radially between the first plate of the metallic support structure and the primary gas path, and the second end wall arranged radially between the second plate of the metallic support structure and the primary gas path.

17. A turbine vane assembly, the assembly comprising
a ceramic matrix composite heat shield, the heat shield including an airfoil shaped to define a cavity extending radially through the airfoil,
a metallic support structure including a spar that extends through the cavity of the airfoil and a plate fixed to the spar outside the cavity, the plate sized and arranged so as not to fit through the cavity, and
interface components configured to that interconnect the ceramic matrix composite heat shield with the metallic support structure, the interface components including a first collar arranged radially between the plate of the metallic support structure and the ceramic matrix composite heat shield, a second collar arranged so that the ceramic matrix composite heat shield is radially between the first collar and the second collar, and a bias member that extends from the first collar to the second collar through the cavity of the airfoil included in the ceramic matrix composite airfoil.

18. The assembly of claim 17, wherein the bias member is co-axial with the spar of the metallic support structure.

* * * * *